May 25, 1937.  W. M. SCHOLL  2,081,716
FOOT TREATMENT PAD AND ITS MANUFACTURE
Filed Dec. 11, 1933
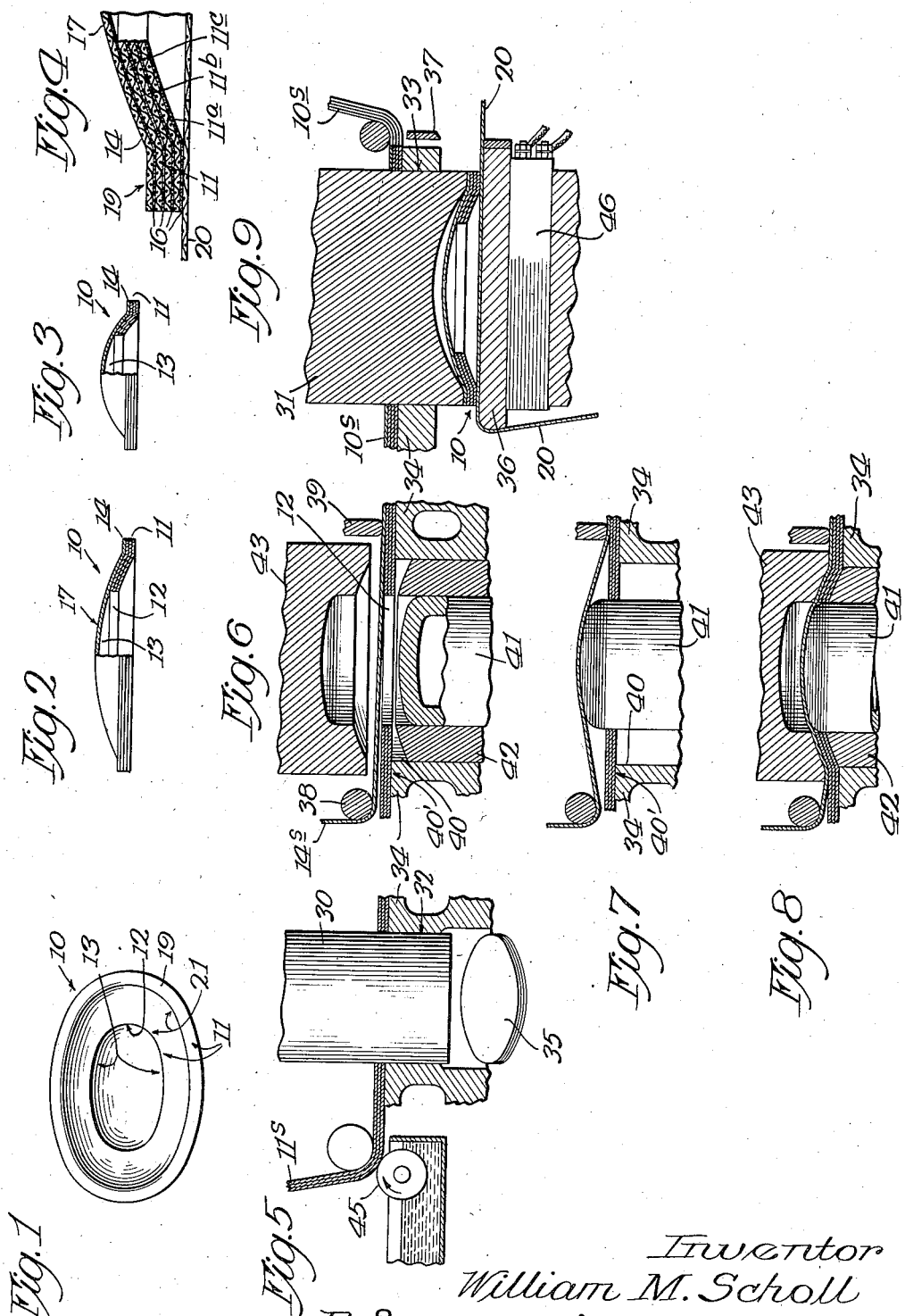
Inventor
William M. Scholl
By Rector, Hibben, Davis & Macauley Attys.

Patented May 25, 1937

2,081,716

UNITED STATES PATENT OFFICE 2,081,716

FOOT TREATMENT PAD AND ITS MANUFACTURE

William M. Scholl, Chicago, Ill.

Application December 11, 1933, Serial No. 701,834

11 Claims. (Cl. 128—153)

My invention relates to foot-treatment pads and their making, and more particularly to pads of the adhesived-fabric, recessed type; that is to say, pads made up of superimposed layers of fabric stuck together by films of suitable adhesive material, the top layer or cover-piece being imperforate and the subjacent layer or layers of the body or "ring" being cut away to define the outline of a shielding recess open to the adhesive-coated underside of the pad.

Pads of this type are generally oval in outline and usually have their top and bottom layers, at least, made of quite-closely woven cotton fabric, substantially non-elastic and highly stretch-resistant in character, for requisite maintenance of initial outline under the quite-severe conditions of use; the intermediate layer or layers (if any), incorporated in the shielding ring to give it desired thickness, being usually of the same material although sometimes made of softer stuff, such as cotton-flannel, or the like.

As a commercial article, the pad, or a group of pads, is adheringly mounted on a carrier strip, usually of open-mesh fabric such as stiffened gauze or crinoline, to protect the adhesived bottom surface pending use.

In all of the commercial pads of this type of which I am aware, the pad construction is essentially flat or planar, the bottom surface of the body-ring, when placed on the flat carrier strip, wholly conforming to and adheringly engaging it, and the top layer or cover piece extending flatwise over the body-opening.

In use, the flexibility of the pad is its characteristic solely depended on to let it take such sectional contour as it must for proper adhesion to and shielding of the affected area of the foot. Usually this general area is rounded, rather than flat, with the corn or bunion that is to be shielded forming a further, distinct protuberance. In such instances the flatness of the pad and the necessary resistivity of its layers to any area-changing stretch, often give rise to various troubles, among the most common of which are, difficulty in properly applying the pad in the first instance to fit smoothly and with full adhesion, slippage or separation between the adhesived layers as the shielded protuberance pushes out the center of the cover piece, and further deterioration of the pad resulting from the consequent exposure of adhesived surfaces near the margins of the base layer or layers, which, creating sticky spots on the stocking, quickly provoke wrinkling and further distortion of the pad under the shoe pressure and rubbing incident to walking.

The general objects of my invention are to provide an improved pad of the stuck-together, recessed fabric type which is structurally curve-contoured or "domed" in longitudinal and transverse section after a fashion which lessens or obviates in use many of the disadvantages of the flat-constructed pad, and to provide an adequate, simple and inexpensive method of manufacturing the pads from fabrics of the character above referred to and mounting them on carrier-material as finished commercial products, all in a fashion which preserves the salient advantages of the stuck-together fabric type of pad that have long given this type its great popular preference over shields of molded rubber or metal, and stitched-together cushions, which often are curve-contoured in divers sectional shapes.

Other, more specific objects of my invention will become apparent from the following description, taken in conjunction with the accompanying drawing, wherein I have set forth a single preferred embodiment of my improved pad and a preferred method of making and mounting the same.

In the drawing

Figure 1 is a bottom plan view of a pad embodying my invention;

Fig. 2 is a side elevation thereof with parts in section;

Fig. 3 is a similar end view;

Fig. 4 shows a fragmentary section of an edge portion of the pad on a large scale and in conventionalized form;

Fig. 5 shows, by longitudinal section through the parts, a step of aperturing a strip of pad-body stock;

Fig. 6 similarly shows the presentation of the apertured pad-body stock and a strip of cover-piece stock in position to be sectionally curve-contoured and adhesively united;

Fig. 7 is a similar view showing an operation of "dome-gathering" the top-layer stock preliminarily to uniting it to the body stock;

Fig. 8 shows the sectional contouring and stock-uniting operations in course of completion; and Fig. 9 shows the completed and severed pad being mounted on its carrier-gauze.

Pads embodying my invention may be made in a diversity of sizes, plan-outlines and thicknesses, for use on corns and bunions, but for purposes of full disclosure of one desirable embodiment of my invention, the pad herein shown and generally indicated by numeral 10 may be regarded as representing a pad of bunion size, oval in outline and about 2 inches long; its body or ring 11 being made of a plurality of layers of adhesived fabric, ovally apertured as at 12 to provide the vertical wall of the shielding recess 13, and the cover-piece 14 whereof is a single imperforate layer adheringly surmounting the body.

In Fig. 4 the body ring 11 is shown as made up of three equal-thickness layers 11ª, 11ᵇ, 11ᶜ of fabric, and the cover piece is shown as a single layer of fabric of like thickness; the films of adhesive coating the underside of the respective fabric layers being indicated at 16. Throughout the drawing, fabric thicknesses are exaggerated, for clarity. Illustratively, straight-woven cotton cloth of about .010-inch thickness having about 80 threads to the inch, and bottom coated with an adhesive film about .003-inch thick, may be used with good results in all of the layers of the structure detailed in Fig. 4, although it will be understood that where a quite thick body-ring is desired, with a reduced number of adhesive films, double-thickness-woven cotton cloth of greater thread-count per inch, giving similar resistivity to stretching, may be used, and also that when slight softness of the body-ring is desired an intermediate layer of cotton-flannel or the like may be incorporated between the highly stretch-resistive bottom layer and top layer.

As here shown, the curve-contouring of the pad in longitudinal and transverse section increases the maximum depth of the shielding recess 13 to more than double that of a flat pad of the same body-thickness; 17 indicating the domed center-portion of the cover piece 14, which may be spaced from the bottom of the pad by from two to three times the thickness of the body layer, and which extends with smoothly graduated curvatures over the domed area of the pad and is smoothly laid over, and adheringly connected to, the entire top surface of the body-ring.

In the preferred contouring here shown, a marginal portion, 19, of the pad is formed as a flat "land" or mounting-rim, to facilitate mounting of the pad adheringly on a flat carrier strip 20 of appropriate material such as the customary stiffened gauze or crinoline. Within this flat margin, both the body-zone 21 and the cover piece are domed, most desirably with gradual curvatures consistent with quite-uniform distribution of the excess cloth incorporated in the cover piece.

The fullness of the top layer material necessary for the doming is chiefly provided by making that layer of greater "blank-area" cut from the initially-flat cover-piece stock than the outline-area of the finished pad, whereas the body layer or layers of fabric are desirably made with a "blank-area" equal to the outline area of the pad; it being desirable, however, to give the domed center 17 of the cover piece a slight, additional, permanent stretch, smoothly to "set" its shape, and the dome-contouring of the body layers in the zone 21 being accomplished by slight permanent stretching and displacement of the fabric threads, which take place quite readily in the raw edges of the cloth bordering the aperture 13.

In practice, the pads constructed and shaped as above described present a smooth, unwrinkled surface throughout the domed portion and also of the marginal mounting area 19; the flat mounting rim being preferably subjected to heavy pressure between flat confronting surfaces in the course of fabrication of the pads.

In use, the pads above described are very effective in promoting comfort and also in avoiding the difficulties of initial application, of rapid deterioration, of sticking to hosiery, and other drawbacks that are quite commonly experienced in the use of ordinary flat pads on corns or callouses growing on abruptly curved parts of the foot or themselves projecting considerably beyond the surrounding flesh; which when used under conditions of less difficulty they give even greater insurance against such drawbacks. The easy flexing of the excess fabric that is gathered to provide the dome, and of the somewhat spread and loosened raw edges of the cloth bordering the shielding recess, accommodates a wide range of conditions affecting the shape of the area to be shielded; the bland, soothing adhesive will very fully adhere to such area, and thus the adhesion of the layers of the pad to each other, and of the bottom fabric to the flesh, will be relieved in large measure of strains tending to break the adhesion or relatively displace the pad-layers.

Figs. 5 to 9 show a method by which pads as above described may cheaply and rapidly be made from long strips of adhesived fabric-stock and turned out as commercially complete articles mounted on a carrier strip, with assurance that the pads will have the desired characteristics above referred to.

In the procedure there shown, pad-body stock 11ˢ, with its requisite number of layers pre-united into a multi-ply strip, is fed step by step from a supply roll (not shown) to successive work-stations represented by respective Figures 5, 6 and 9, and cover-piece stock 14ˢ is similarly fed to the second and third stations, to be combined with the body stock in due course.

At the first station (Fig. 5) the body-stock is punched to form apertures 12; at the second (Fig. 6), the cover-piece stock 14ˢ and the body-stock 11ˢ are given their appropriate dome-contoured and flat-margined shape and are adhesively united, ready for outline severance; and at the last station (Fig. 9) the completed pad is punch-severed from the contoured composite pad-stock 10ˢ and punch-mounted on the carrier strip 20 which thereafter is cut to lengths, each carrying one or more of the completed pads, ready for packaging and sale.

The two punches 30 and 31 used to cut the fabrics in, respectively, aperturing the body-stock (Fig. 5) and severing the completed pads (Fig. 9), coact with and strike through corresponding die-orifices 32 and 33 in a stock-supporting table 34; the die 30 operating to strike the waste center-pieces 35 down into a waste-space below the table, and the punch 31, suitably shaped on its underside to contact with only the land or mounting-rim 19 of the pad-stock, operating to sever the completed pad and strike its land 19 into flat engagement with the flat carrier strip 20 of crinoline, supported on table 36 below; after which the crinoline is moved forward and cut into lengths by blade 37.

In the sequence of operations of the devices at the several stations, it is desirable that the punches 30 and 31 shall both be in depressed position, extending through the stock, when the curve-contouring operations are performed at the intervening station shown in Fig. 6, since the spacing between the several stations may be such that under these conditions an aperture 12 of the body stock 11s will be in accurate register with the contouring instrumentalities shown in Fig. 6, and the body stock will be firmly held against shifting under the contouring operations.

At the station shown in Fig. 6 the cover-piece stock 14s is guided, as by guides 38 and 39, into close proximity to the top of the body-stock, ready to have extra cover-piece material drawn forward under the guide 38 to give the desired fullness for doming; the body-stock 11s preferably extending smoothly across a table-aperture 40 which is of an outline corresponding with the inner perimeter of the land 19 of a pad and in which the male members of the forming device are slidably mounted. As here shown, these members comprise a plunger or center-former 41 shaped to pass neatly through the pad-aperture 12, and the ring-former 42 fitting between the plunger and the table-aperture walls; these two parts being relatively slidable; while the female former-member or head 43 is of complete pad-size and bottom-contoured for coaction with the forming-members below it. In the preferred form here shown its deep-center recess accommodates the fabric raised by the center-former 41 and its concaved ring-zone and flat margin are complemental to the ring-former 42 and the flat rim 40' of the table-aperture.

By suitably raising the center-former 41, in the fashion shown in Fig. 7, the cover-piece stock 14s is gathered, radially, in effect, into a hump providing an excess or fullness of unstretched cloth that preferably is almost, but not quite, sufficient for the full dome-size; and by bringing the ring-shaping members 42 and 43 toward their mating position (preferably while this humping is occurring) and giving a final, slight, but powerfully-urged stretching-thrust to the plunger 41 after the head-member 43 has been struck home to flatten the land or rim portion 19 of the pad against the flat rim 40' of the table-orifice and preferably while the convex end of the ring-former 42 is being forcibly driven against head 43, the pad is given the desired contour and the cover-piece is firmly and smoothly united with the ring; with the threads of the imperforate domed portion of the cover piece forcibly stretched a little beyond the slight limit of their elasticity to assist in giving the single-thickness crown of the dome 17 a permenent "set", and with the raw-edged fabric of the body-zone 21 sufficiently displaced and/or stretched to maintain the domed contour of such ring-zone.

Although the area of the cover piece incorporated in the marginal rim or land 19 is somewhat greater than that of the body-layers below it, this rim-part of the cover-piece is smooth and unwrinkled, the even distribution of the cloth and the yield of the plastic adhesive doubtless contributing to the accommodation of such slight thread-displacements as may be necessary to the smooth effect.

For preventing troublesome adhesion of the adhesived bottom surface of the body stock and cover-piece stock to the table or plunger, both the table and plunger may have openings for the circulation of a coolant, as suggested by hollow spaces illustrated in these parts, and the body layer may be given a light coating of alcohol, as by a coating roller 45, before being led onto the table; while to better insure adhesion of the narrow mounting-rim 19 of the pad to the crinoline 20, the crinoline-table 36 may be surface-heated as by an electric heater 46.

While I have herein described a preferred construction of a particular pad, and a detailed method of making the same, for purposes of full disclosure, it will be understod that in its broader aspects my invention is susceptible of many modifications without departure from the spirit thereof and within the scope of the appended claims.

I claim:

1. A foot-treatment pad formed of superimposed layers of flexible material adhesively connected, comprising a body-ring, adhesive-coated on its underside and having a recess-aperture therethrough, and an imperforate cover-piece coated with adhesive throughout its underside and mounted on said body-ring; the bottom layer and cover layer at least being of quite closely-woven fabric giving the pad desired resistance to distortion from initial perimetral contour, and said cover layer being of larger area than the body ring and having part of its excess material formed into a dome, above the ring-aperture, substantially increasing the depth of the corn-receptive space and decreasing likelihood of cover-layer displacement under flexure in application and shear-strains in walking.

2. A foot-treatment pad formed of superimposed layers of flexible material adhesively connected, comprising a body-ring, adhesive-coated on its underside and having a recess-aperture therethrough, and an imperforate cover-piece coated with adhesive throughout its underside and mounted on said body-ring; the bottom layer and cover layer at least being of quite closely-woven fabric giving the pad desired resistance to distortion from initial perimetral contour, and said cover layer being of larger area than the body ring, and said ring and cover-layer being jointly curve-contoured convexly in longitudinal and transverse section adjacent to and above the ring aperture, thereby substantially increasing the depth of the corn-receptive space and lessening the liklihood of relative displacement of layers under conditions of use.

3. A foot-treatment pad formed of superimposed layers of flexible material adhesively connected, comprising a recess-apertured body-ring having a bottom fabric adhesive-coated on its underside, and an imperforate fabric cover-piece adhesively mounted on the body and extending over its aperture, said cover-piece being of larger plan area than the body-ring and including within its area overlying said body an excess of fabric smoothly formed into a dome projecting above the aperture in body, the portion thereof spanning the body-aperture being slightly stretched beyond the elastic limit of its threads to "set" the dome-contour.

4. As an article of manufacture a mounted foot-treatment pad including a flat carrier-strip and a fabric pad, undercoated with adhesive, adheringly mounted thereon; said pad being formed of a plurality of adhesive-connected superimposed layers of flexible material and providing an apertured body-ring and a cover-layer of fabric adhering to the ring and overlying the aperture, said pad having a flat-rim-portion adjacent its perimeter mounted flat on the carrier-strip and having its cover-layer and ring jointly domed within the confines of said rim to provide substantial increase in the corn-receptive depth of the shielding recess and decrease the liklihood of layer-shifting in application and use.

5. In the manufacture of a multi-layer, adhesived-fabric foot-treatment pad that comprises an apertured body-ring and a domed cover-piece adhesively attached thereto, the steps of gathering adhesived cover-piece stock into a hump, applying the humped stock adheringly to apertured body-stock while at the same station, with the humped portion rising as a dome above the body-aperture; and cutting the complete pads from the composite body-and-cover-piece stock.

6. In the manufacture of a multi-layer, adhesived-fabric foot-treatment pad that comprises an apertured body-ring and a domed cover-piece adhesively attached thereto, the steps of gathering adhesived cover-piece stock into a hump, applying the humped stock adheringly to apertured body-stock while at the same station, with the humped portion rising as a dome above the body-aperture, imparting a slight permanent stretch to the dome-forming threads of the cover-piece stock, and cutting the complete pads from the composite body-and-cover-piece stock.

7. In the manufacture of a multi-layer, adhesived-fabric foot-treatment pad mounted on a flat carrier-strip and comprising a recess-apertured body-ring and a domed cover-piece adhesively attached thereto, the steps of gathering adhesived cover-piece-stock into a hump, applying the humped stock adheringly to one side of the apertured body-stock adhesived on its other side with the humped portion of the cover-piece stock domed above the body-aperture, pressure-forming the composite stock into a flat-rimmed pad-stock strip providing an apertured body-ring and a cover-piece domed to increase the depth of the pad-recess to double or more the thickness of the body-stock, cutting the complete pad from the composite stock, and pressure-mounting its flat rim adheringly on the carrier-strip.

8. Steps in the process of making adhesived-fabric foot-treatment pads consisting of hump-gathering cover-piece stock above the aperture of body-ring stock; dome-forming and adhesively uniting the said stock-fabrics; and imparting a setting stretch to the dome portion of the cover-piece stock after marginally uniting same with the body-ring stock.

9. In the manufacture of a multi-layer, adhesived-fabric foot-treatment pad mounted on a flat carrier-strip and comprising a recess-apertured body-ring and a domed cover-piece adhesively attached thereto, the steps of punching a strip of body-piece material at one station, gathering a section of a strip of cover-piece material into a dome and then applying the domed portion of said cover-piece material adhesively to the apertured body-piece material at a second station, and punching the united body-piece material and cover-piece material to form the complete pads at a third station, said strip of body-piece material being restrained by the punching member at the first station and said united material being restrained by the punching member at the third station while the cover material is being domed at the second station.

10. In the manufacture of a multi-layer, adhesived-fabric foot-treatment pad that comprises an apertured body-ring and a domed cover-piece adhesively attached thereto, the steps of first forming apertures in body stock, then gathering cover-piece stock into humps in proximity to and in alignment with the apertures in the body stock and applying said humped stock adhesively to said body stock with the humped portions rising as domes above the corresponding body-apertures, and finally cutting the complete pads from the composite body-and-cover-piece stock.

11. In the manufacture of a multi-layer, adhesived-fabric foot-treatment pad that comprises an apertured body-ring and a domed cover-piece adhesively attached thereto, the steps of first forming apertures in body stock, then gathering cover-piece stock into humps in proximity to and in alignment with the apertures in the body stock and applying said humped stock adhesively to said body stock with the humped portions rising as domes above the corresponding body-apertures, then imparting a setting stretch to said domed portions of the cover-piece stock after said stock has been marginally united with the body-ring stock, and finally cutting the complete pads from the composite body-and-cover-piece stock.

WILLIAM M. SCHOLL.